(12) United States Patent
Moon

(10) Patent No.: US 8,606,912 B1
(45) Date of Patent: *Dec. 10, 2013

(54) STATISTICS OVERLAY

(75) Inventor: Hui Sok Moon, Campbell, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,761

(22) Filed: Sep. 14, 2012

Related U.S. Application Data

(63) Continuation of application No. 11/733,656, filed on Apr. 10, 2007, now Pat. No. 8,301,754.

(51) Int. Cl.
G06F 15/173 (2006.01)
G08G 1/123 (2006.01)
H04M 3/42 (2006.01)

(52) U.S. Cl.
USPC ...... 709/224; 709/225; 340/995.1; 455/414.2

(58) Field of Classification Search
USPC .................................. 709/203–207
See application file for complete search history.

(56) References Cited

U.S. PATENT DOCUMENTS

| | | | |
|---|---|---|---|
| 6,792,458 B1 | 9/2004 | Muret et al. | |
| 7,146,416 B1 | 12/2006 | Yoo et al. | |
| 2003/0208594 A1 | 11/2003 | Muret et al. | |
| 2005/0114510 A1* | 5/2005 | Error et al. | 709/225 |
| 2006/0267802 A1* | 11/2006 | Judge et al. | 340/995.1 |
| 2007/0208751 A1 | 9/2007 | Cowan et al. | |
| 2007/0258438 A1 | 11/2007 | Bennett | |

OTHER PUBLICATIONS

Google/Analytics. What is the Site Overlay report? [on-line]. 2007 [retrieved Apr. 10, 2007]. Retrieved from the internet: <http://www.google.com/support/analytics/bin/answer.py?answer=44724&query=site+overlay&topic=&type=>.
Google/Analytics. Why is my Site Overlay report not working? [online] 2007 [retrieved Apr. 10, 2007]. Retrieved from the Internet: <http://www.google.com/support/analytics/bin/answer.py?answer=27231&query=site+overlay&topic=&type=>.

* cited by examiner

*Primary Examiner* — Evans Desrosiers
(74) *Attorney, Agent, or Firm* — Fish & Richardson P.C.

(57) ABSTRACT

A publisher web page is rendered at a client device from a publisher and the client device issues a request for traffic statistics data related to traffic content in the web page. The client device receives the traffic statistics data and overlays the traffic statistics data on the web page, e.g., proximate to the related traffic content in the web page.

20 Claims, 12 Drawing Sheets

STATISTICS OVERLAY

CROSS REFERENCE TO RELATED APPLICATION

This application is a continuation application of, and claims priority to, U.S. patent application Ser. No. 11/733,656, entitled "STATISTICS OVERLAY," which was filed on Apr. 10, 2007. The disclosure of which is incorporated herein by reference in its entirety.

BACKGROUND

This disclosure relates to web site statistics.

A web publisher is an entity, such as person or an enterprise, that hosts web pages or web sites that can be accessed over a network, such as the Internet. The publisher can monitor analytical data related to user visits and links to the publisher web pages or web sites. Example analytical data includes data related to domains and/or web sites from which visitors arrived and to which the visitors departed; traffic patterns, e.g., navigation clicks of visitors within the publisher's web site; visitor actions, e.g., purchases, filling out of forms, etc. and other actions that a visitor may take in relation to the publisher's web site. The analysis of such analytical data can, for example, inform the publisher of how the visitors found the publisher's web site and how the visitors interacted with the publisher's web site. With this understanding, the publisher can implement changes to increase revenue generation and/or improve the visitor experience. For example, a publisher can focus marketing resources on advertising campaigns, and/or identify web site bottlenecks that impede the visitor experience, and/or identify other publishers as potential partners for cross-linking, etc.

Analytical tools that facilitate the collection and analysis of such analytical data are available to publishers. An example analytical suite is Google Analytics, and which is available from Google, Inc., in Mountain View, Calif. One example analytical analysis feature is a site overlay report. A site overlay report can be prepared by the analytical suite, for example, and generate a representation of the web page with a visual representation of traffic statistics data displayed proximate to traffic content, e.g., web links, on the web page. For example, web links defined by the hypertext markup language (HTML) instructions of the web page can be identified and the cumulative number of clicks for each web link can be displayed adjacent each link when the web page representation is rendered.

SUMMARY

Disclosed herein are systems and methods for statistics overlays. In one implementation, an overlay for a web page is rendered on a client device having an analysis session directed to the web site of the publisher. The publisher web page can, for example, be received at the client device from the publisher and rendered at the client device, and the client device can request traffic data from a statistics server. The traffic data can be provided to the client device from the statistics server, and the client device can render graphical representations based on the traffic data proximate to traffic content in the web page.

In one implementation, a web page is rendered at a client device and the client device issues a request from the client device for traffic statistics data related to traffic content in the web page. The client device receives the traffic statistics data, and overlays the traffic statistics data on the web page.

In another implementation, traffic statistics session instructions are provided to a client device and a traffic statistics session is requested from a client device based on a rendering of a web page and execution of the traffic statistics session instructions by the client device. Traffic statistics data processing instructions are provided to the client device in response to the traffic statistics session request. The traffic statistics data processing instructions are configured to cause the client device to render traffic statistics data overlaid on related traffic content on the web page.

In another implementation, a system includes a data store storing distributable instructions that are executable by computer devices. The distributable instructions include traffic statistics session instructions and first traffic statistics instructions. The traffic statistics session instructions are configured to cause a computer device to issue a request for a web page, and the web page request includes a traffic statistics signal. The first traffic statistics instructions are configured to cause a computer device to request traffic statistics data and to generate overlay data for the traffic statistics data so that rendering of the web page and the overlay data displays the traffic statistics data on the web page.

In another implementation, a request for web page instructions for a web page from a publisher is processed to determine if the request for the web page instructions includes a traffic statistics signal. If the request for the web page instructions for the web page includes the traffic statistics signal, traffic statistics data for the web page are requested from a traffic statistics server. Overlay data is generated for the traffic statistics data so that rendering of the web page and the overlay data displays the traffic statistics data proximate to related traffic content in the web page.

These and other example implementations can, but need not necessarily include, one or more of the following features or advantages. In one implementation, a web page can be received from a publisher at a client device in native form, and additional processing can be performed at the client device to generate an overlay of traffic statistics data. In another implementation, additional processing can be performed at a publisher server before the web page is served to a requesting client device. The addition processing at the publisher server can provide additional web page instructions that upon execution by the client device generate an overlay of traffic statistics data. In both implementations, the native form of the web page can be preserved so that the underlying visitor experience, e.g., full functionality of all features of the webpage, is presented to a user of the client device rendering the web page.

DETAILED DESCRIPTION

Figure 1:
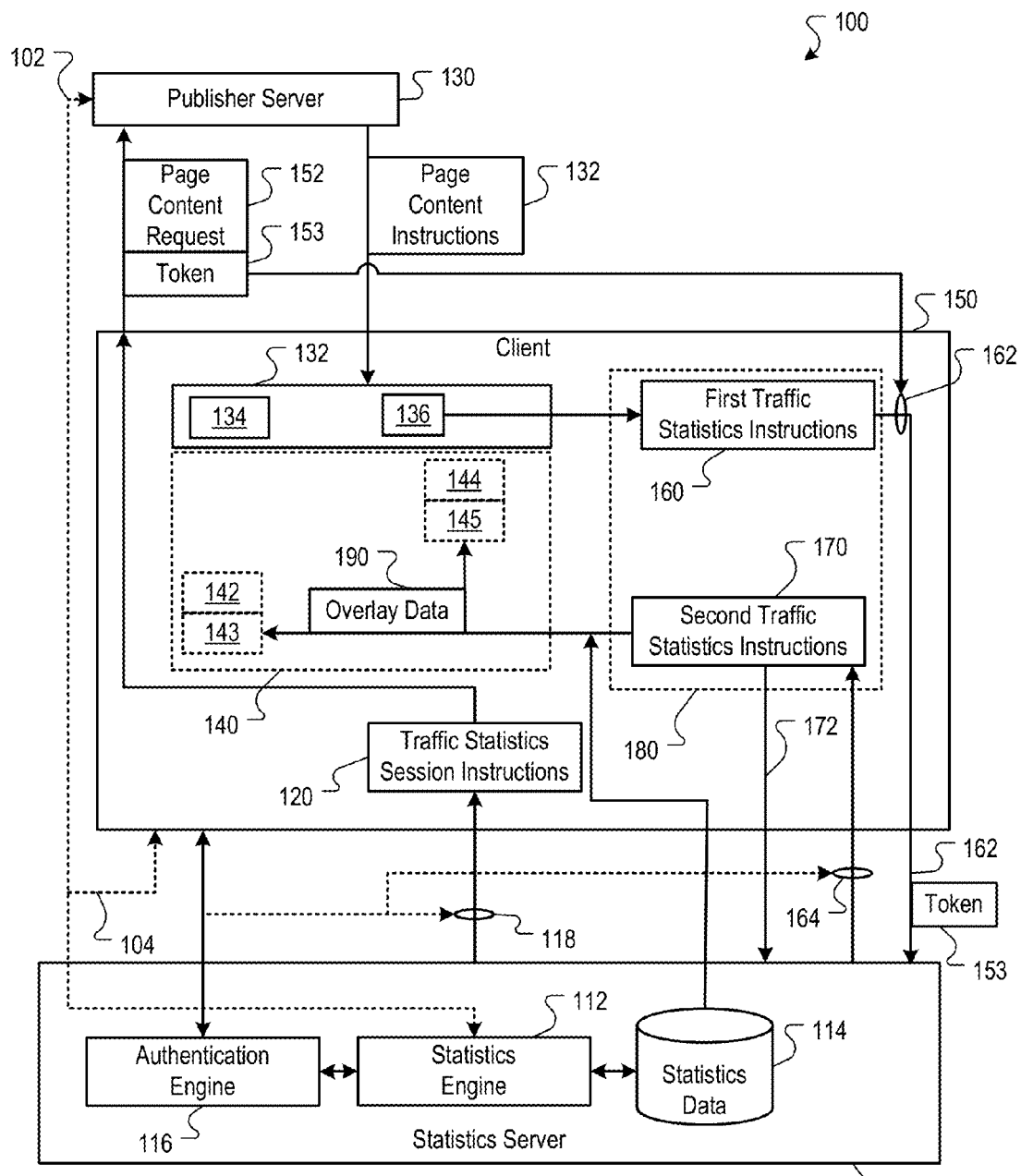
FIG. 1 is a block diagram of an example environment for processing a statistics overlay.

FIG. 1 is a block diagram of an example environment 100 for processing a statistics overlay. The example environment 100 of FIG. 1 describes a client-side statistics overlay implementation. Statistics overlay processing can also be implemented on a publisher side, as shown and described with respect to FIG. 2. Other overlay processing distributions can also be used.

Figure 14:
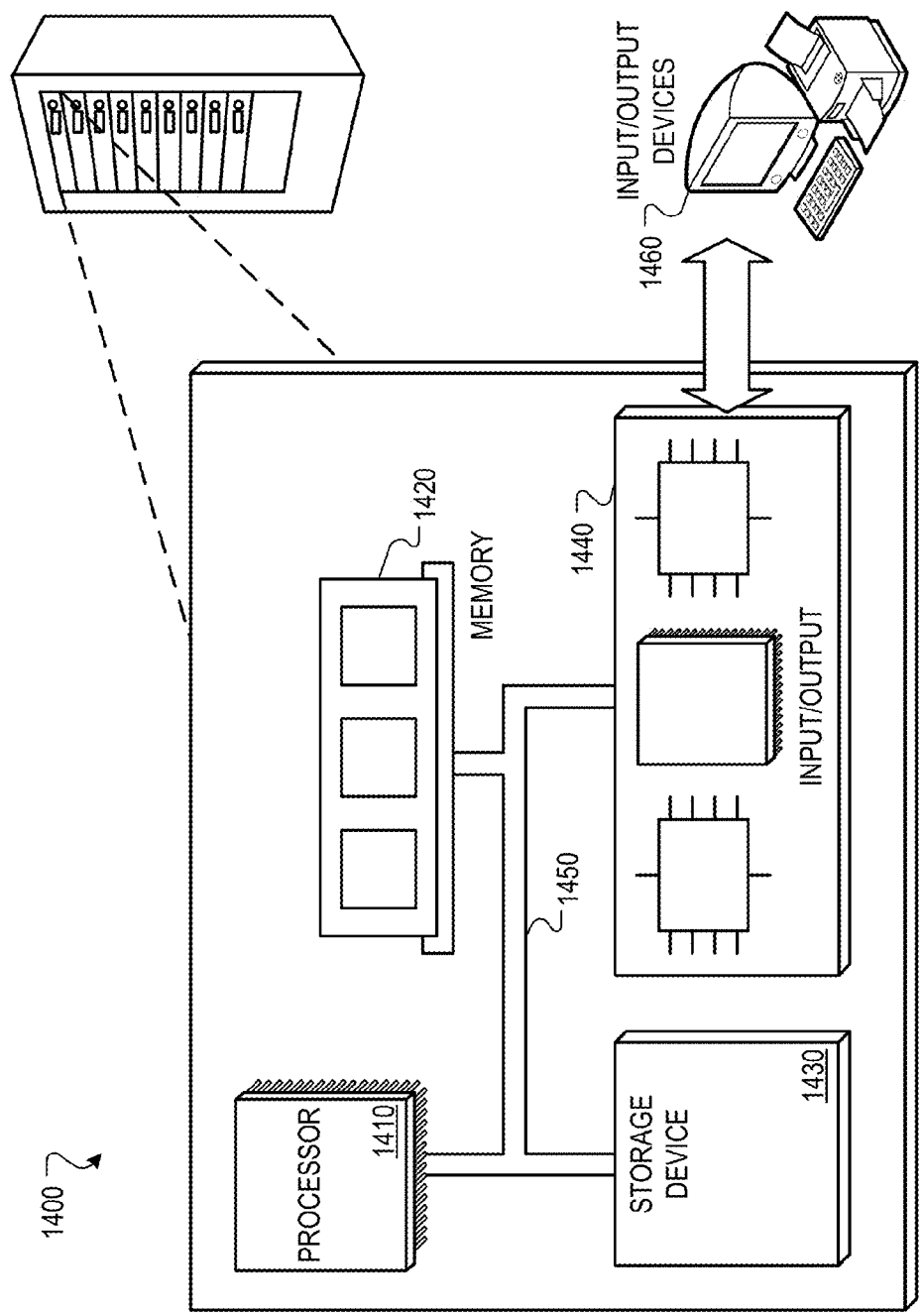
FIG. 14 is a block diagram of an example computer system that can be utilized to implement the systems and methods described herein.

In one implementation, a statistics server 110 can, for example, be configured to track traffic statistics and analyze traffic statistics related to a publisher web site, such as an example publisher server 130. The traffic statistics can, for example, relate to visitor traffic from client devices, such as an example client device 150. Each of the statistics server 110, publisher sever 130 and the client device 150 can communicate over a network, such as a local area network (LAN), a wide area network (WAN), such as the Internet, or a combination of networks, such as wireless networks in communication with a WAN over a gateway device, for example. An example device (e.g., a computer system component) that can be utilized to implement the statistics server 110, the publisher server 130, and/or the client device 150 is shown in FIG. 14 below.

The statistics server 110 can, for example, receive traffic data from the publisher server 130 over a first data communication 102. Likewise, the statistics server 110 can, for example, receive traffic data related to the publisher server 130 from the client 150 over a second data communication 104. The data communications 102 and/or 104 can, for example, be facilitated by tracking software instructions that are executed at the publisher server 130 and/or at the client device 150, respectively. The traffic data received from the communications 102 and/or 104 can, for example, be processed by a statistics engine 112 and stored as statistics data 114. Example implementations for tracking and processing such traffic data are shown and described in U.S. Pat. No. 6,792,458, entitled "System and Method For Monitoring And Analyzing Internet Traffic," and United States Patent Publication No. 2003/0208594, entitled "System and Method For Tracking Unique Visitors To A Website," the disclosures of which are incorporated herein by reference. Other implementations for tracking and processing such traffic data can also be used.

The client device 150 can, for example, be a computer device including a web browser. Other client device 150 implementations can also be used, e.g., a mobile communication device, a set top box, or some other device executing network navigation software. In one implementation, the client device 150 can, for example, issue a web page request 152 to the publisher 130. In response, the publisher can return web page content instructions 132, e.g. a hypertext markup language (HTML) source document, to the client device 150.

The web page content instructions 132 can, for example, include traffic content instructions 134 that define traffic content 142 and 144, e.g., web links, etc.

Upon execution by the client device 150, the web page content instructions 132 and the traffic content instructions 134 can cause the client device 150 to generate a web page 140 that includes traffic content 142 and 144 on a display device. Example traffic content include links to other web pages within the domain of the publisher server 130, links to other web sites, forms, dynamic traffic content, such as javascripts, or other traffic content that facilitates visitor interaction and/or navigation.

In one implementation, traffic statistics data 114 related to the traffic content 142 and 144 can be overlaid proximate, e.g., adjacent to, the traffic content 142 and 144. For example, traffic statistics data 114 in the form of the visual representations 143 and 145 and that is related to the traffic content 142 and 144 can be displayed proximate to the traffic content 142 and 144. Thus, if the traffic statistics data relates to navigation statistics, such as cumulative clicks for corresponding page links, then visual representations 143 and 145 of the magnitude of the cumulative clicks, e.g., weighted bars, can be displayed proximate to related page links 142 and 144 in the displayed web page 140.

In one implementation, the page content instructions 132 can include instructions 136 that can, for example, facilitate the processing of traffic statistics. In one implementation, an authorization process is utilized to ensure that a user of the client device 150 is authorized to access and view correspond statistics data 114 for the web page 140 defined by the web page content instructions 132. To access the corresponding statistics data 114 and to view the traffic statistics data representation 143 and 145 displayed proximate to the related traffic content 142 and 144, a user of the client device 150 can, for example, log into the statistics server 110 through an authentication engine 116. The authentication engine 116 can, for example store user data, such as a user identifier that identifies the user, an account identifier that identifies an enterprise of which the user is an employee, a user profile that stores various user authorizations, e.g., whether the user has access to certain statistics data, etc.

In one implementation, a successful login 118 authorizes the statistics server 110 to provide traffic statistics session instructions 120 to the client device 150. Execution of the traffic statistics session instructions 120 can, for example, cause the client device 150 to generate a graphical user interface from which the user may instantiate a traffic statistics session at the client device 150. An example graphical user interface from which the user may instantiate a traffic statistics session is show in FIG. 3 below. Other implementations, however, may also be used.

Upon the instantiation of a traffic statistics session for a web page, such as the web page 140 defined by the web page content instructions 132, the client device 150 can, for example, open a new browser window and send the page content request 152 to the publisher server 130. In an implementation, the page content request 152 includes a signal indicative a user's desire to review traffic statistics. For example, a traffic statistics signal can be included in the request. In one implementation, the signal is a token 153. Other signals or data can also be used.

In one implementation, the token 153 is a query parameter appended to the URL of the requested web page 140. The token 153 can, for example, be an encrypted token that includes the user identifier, the account identifier, the profile identifier, and can also include other information, such as a domain and/or host name, token expiration, etc. The token 153 can be utilized as an additional security feature to ensure that the statistics data 114 is provide only to the user that has established an authorized statistics session through the authentication engine 116.

In response to the page content request 152, the publisher server 130 can serve the web page content instructions 132 to the client device 150. In one implementation, the web page content instructions 132 can include instructions 136 that can, for example, include a reference, e.g., a function call, to a set of first traffic statistics instructions 160. For example, execution of the instruction 136 can generate a request as a function call, e.g., "ftsi( )" which calls the first traffic statistics instructions 160. The instructions 136 can be a code snippet that calls a set of instructions, such as a javascript, from the statistics server 110, such as:

```
<script src="http://statistics_server_URL/ftsi.js" type="text/javascript">
</script>
<script type="text/javascript">
    uacct="acctid";
    process_traffic( );
</script>
```

The first traffic statistics instructions 160 can, for example, be received from the statistics server 110 and stored at the client system 150, such as in a cache associated with a web browser. In one implementation, the first traffic statistics instructions 160 can be subsequently served from the cache for subsequent function calls, and are again served when deleted from the cache or when updated at the statistics server 110.

The first traffic statistics instructions 160 can, for example, facilitate the provisioning of traffic data from the client device 150 to the statistics server 110 and/or the publisher server 130, e.g., the function process_traffic( ) may facilitate tracking of traffic data from the client device 150. In one implementation, the first traffic statistics instructions 160 can, for example, include instructions to determine whether the token 153 was included with the page content request 152. Upon a positive determination, the first traffic statistics instructions 160 can cause the client device 150 to request second traffic statistics instructions 170 from the statistics server 110. For example, the positive determination 162 of the presence of the token 153 can cause the first traffic statistics instructions 160 to generate a request 162 as function call, e.g., "stsi( )" which calls the second traffic statistics instructions 170. The request 162 can, for example, be implemented by a code snippet that calls the second traffic statistics instructions 170, such as a javascript, from the statistics server 110, e.g.:

```
<script src="http://statistics_server_URL/stsi.js"type="text/javascript">
</script>
<script type="text/javascript">
    uacct="acctid";
    overlay( );
</script>
```

The request 162 can, for example, include the token 153. In an implementation, the authorization engine 116 can determine whether to validate the token 153 that is received in the request 162. Upon a successful validation 164 of the token 153, the statistics server 110 can provide the second traffic statistics instructions 170 to the client device 150. The second traffic statistics instructions 170 can, for example, be stored at the client system 150, such as in a cache associated with a web browser.

In one implementation, execution of the second traffic statistics instructions 170 can cause the client device 150 to identify the traffic content instructions 134 stored in the web page content instructions 132. The traffic content instructions 134 can, in turn, be utilized to identify the traffic content, e.g., traffic content 142 and 144, in the web page 140. Data related to the identified traffic content 142 and 144 can, for example, be provided to the statistics server 110 in a subsequent request 172. The related data can be used by the statistics server 110 to identify corresponding statistics data 114. The identified statistics data 114 can, for example, be provided to the client device 150, at which time the second traffic statistics instructions 170 can generate overlay data 190.

In one implementation, rendering the overlay data 190 displays the traffic statistics data proximate to the related traffic content 142 and 144 in the web page 140. In another implement, rendering the overlay data 190 displays the traffic statistics data related to the related traffic content 142 and 144 in the web page 140, e.g., near border of the web page, in a separate iFrame, etc.

Example overlay data 190 can include a dynamic HTML script block that can, for example, be configured to display the traffic statistics data representations 143 and 145 proximate to the traffic content 142 and 144. Other overlay data types and/or instructions can also be used.

The authentication and traffic session token process described above can be used to implement several security layers to ensure that statistics data 114 related to web site and/or web pages of the publisher server 130 are protected. Additional security features can also be implemented, e.g., setting the token 153 to expire at the closing of the browser window generated upon instantiation of the traffic statistics session; by validating the token 153 against user account data stored at the statistics server 110; by requiring an additional password from the user upon instantiation of the statistics session; or by other security features.

In one implementation, the first traffic statistics instructions 160 and the second traffic statistics instructions 170 can, for example, be combined into a single set of traffic statistics instructions 180. In this implementation, traffic statistics data related to the identified traffic content instructions 134 can, for example, be provided to the statistics server 110 to identify corresponding statistics data 114 during the first request 162.

In another implementation, processing a statistics overlay can be implemented with fewer or even no security features. For example, authorizations based on the traffic statistics token 153 can be omitted; or a permanent token, e.g., a persistent cookie, can be stored on the client device 150 to enable overlaying of traffic statistics data 114 on the web page 140.

Figure 2:
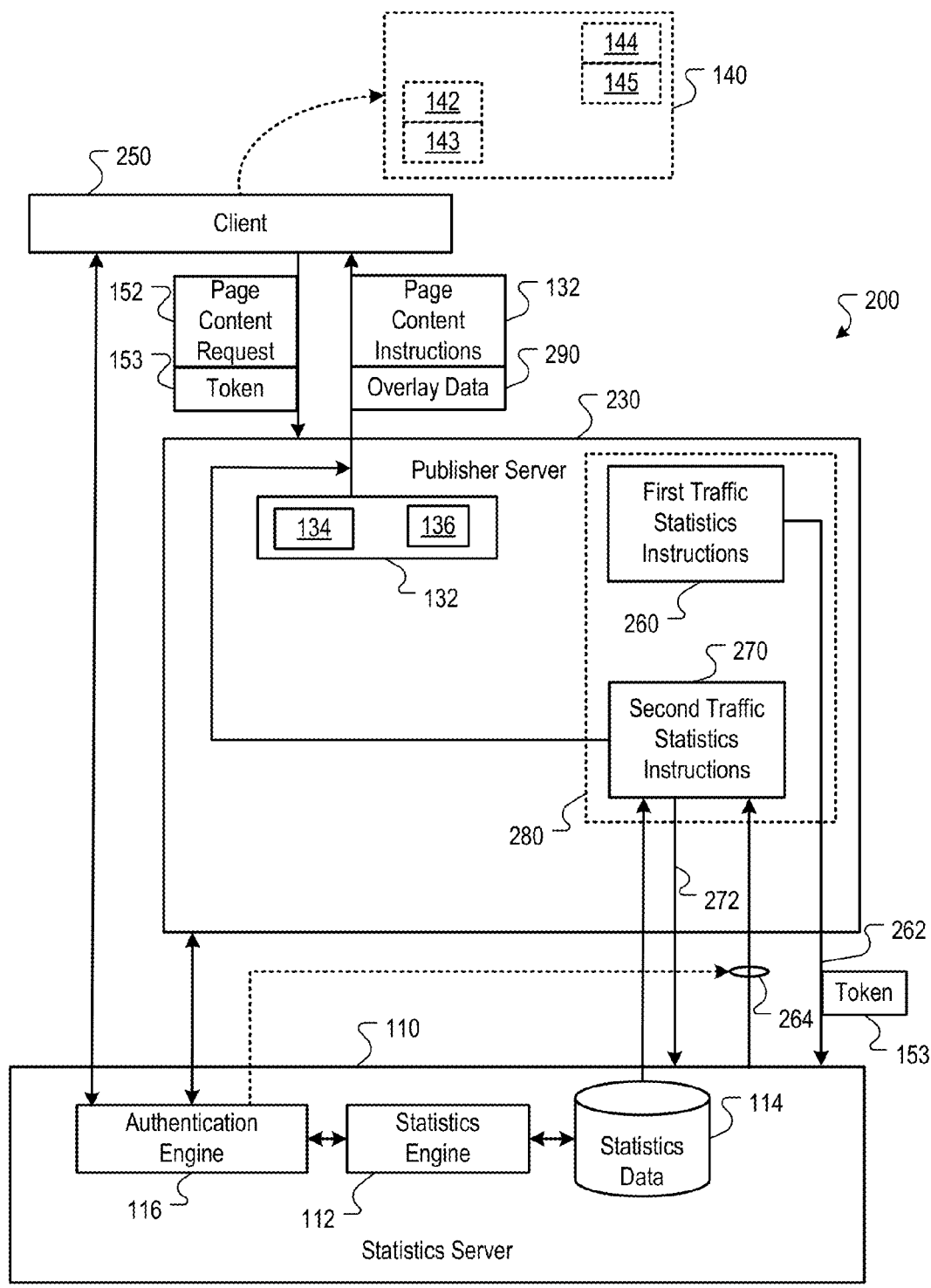
FIG. 2 is a block diagram of another example environment for processing a statistics overlay.

FIG. 2 is a block diagram of another example environment 200 for processing a statistics overlay. In the example environment 200, processing to overlay traffic statistics data 114 is performed at the publisher server 230.

In one implementation, a client device 250 can instantiate a statistics session as described with respect to FIG. 1 above. Upon receiving a page request 152 and a corresponding traffic statistics token 153, the publisher server 230 can be configured to execute first traffic statistics instructions 260. The first traffic statistics instructions 260 can, for example, be received from the statistics server 110 and stored at publisher system 230. The first traffic statistics instructions 260 can, for example, facilitate the provisioning of traffic data from the publisher server 230 to the statistics server 110. In another implementation, the traffic data can be provided to the statistics server 110 automatically, and the provision of such data is not dependent on first traffic statistics instructions 260.

In one implementation, the first traffic statistics instructions 260 can, for example, include instructions to determine whether the token 153 was included with the page content request 152. Upon a positive determination, the first traffic statistics instructions 260 can cause the publisher server 230 to request second traffic statistics instructions 270 from the statistics server 110.

The request 262 can, for example, include the token 153. In an implementation, the authorization engine 116 can determine whether to validate the token 153 that is received in the request 262. Upon a successful validation 264 of the token 153, the statistics server 110 can provide the second traffic statistics instructions 270 to the publisher server 230. The second traffic statistics instructions 270 can, for example, be stored at the publisher server 230.

In one implementation, execution of the second traffic statistics instructions 270 can cause the publisher server 230 to identify the traffic content instructions 134 stored in the web page content instructions 132. The traffic content instructions 134 can, in turn, be utilized to identify the traffic content, e.g., traffic content 142 and 144, in the web page 140. Data related to the identified traffic content instructions 134 can, for example, be provided to the statistics server 110 in a subsequent request 272 to identify corresponding statistics data 114. The identified statistics data 114 can, for example, be provided to the publisher server 230, at which time the second traffic statistics instructions 270 can generate overlay data 290.

The overlay data 290 can be provided to the client device 250 in response to the page content request 152. In one implementation, rendering the overlay data 290 at the client device 250 displays the traffic statistics data proximate to the related traffic content 142 and 144 in the web page 140. In another implement, rendering the overlay data 290 at the client device 250 displays the traffic statistics data related to the related traffic content 142 and 144 in the web page 140, e.g., near border of the web page, in a separate iFrame, etc.

Example overlay data 290 can include a dynamic HTML script block that can, for example, be configured to display the traffic statistics data 143 and 145 proximate to the traffic content 142 and 144. Other overlay data types and/or instructions can also be used.

As described with respect to FIG. 1, various levels of security features and instruction partitions can be implemented. For example, processing of the token 153 can be omitted; the first and second traffic statistics instructions 260 and 270 can be consolidated into a single set of instructions 280, etc.

Other processing distribution schemes can also be used. For example, the statistics server 110 can receive the web page instructions 132, generate corresponding overlay data 290, and provide the overlay data 290 to the client device 250. The client device 250 can, for example, receive the web page instructions from the publisher 230.

The timing diagrams of FIGS. 6-9 below illustrate example implementations of processing distributions that can be used to provide an overlay of traffic statistics data on a web page.

Figure 3:
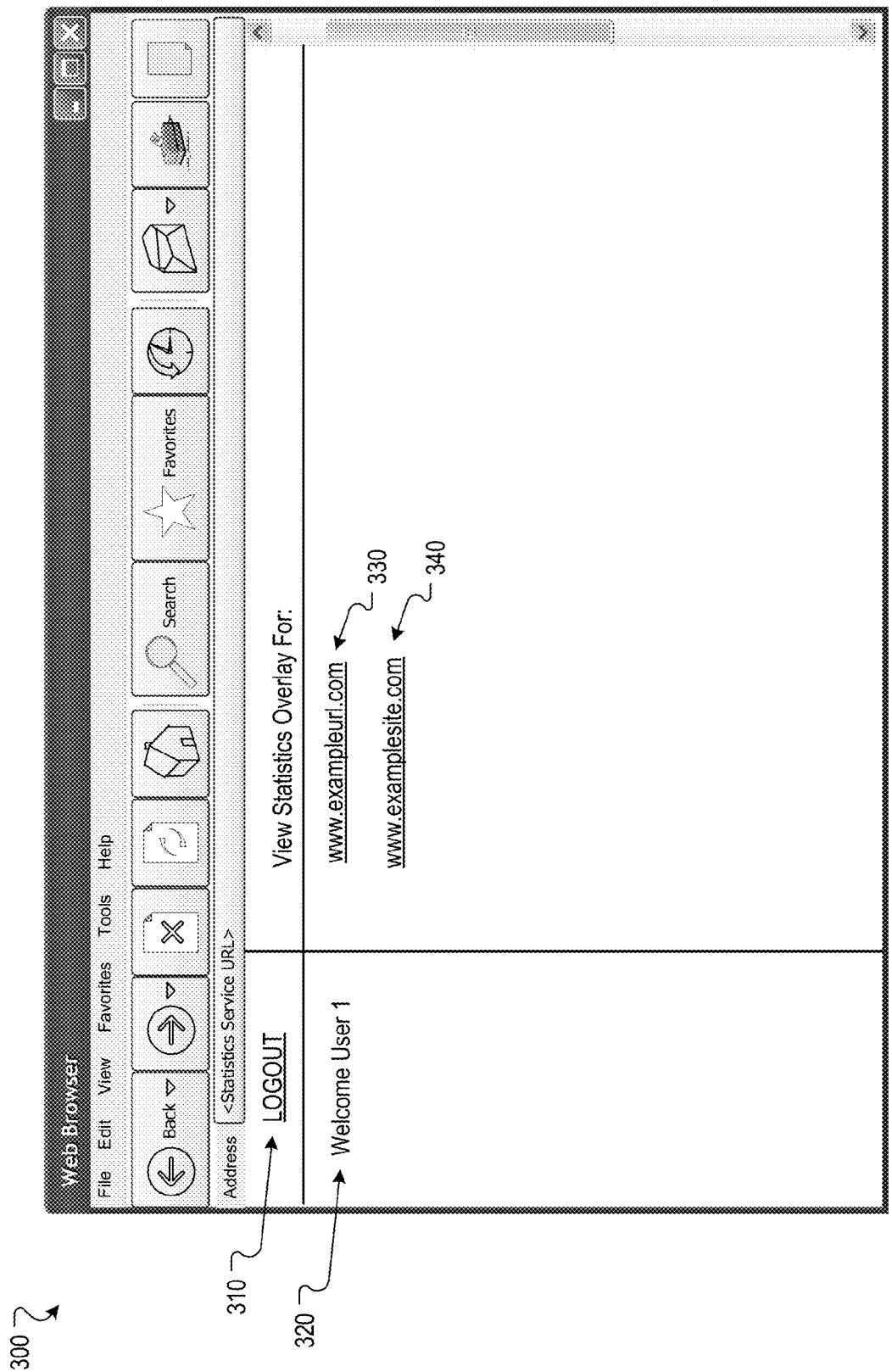
FIG. 3 is a diagram of an example web page for instantiating a statistics session environment.

FIG. 3 is a diagram of an example web page 300 for instantiating a statistics session environment. The example web page 300 can be generated at a client device, such as the client device 150 or 250, in response to executing traffic statistics session instructions 120 received from the statistics server 110. The web page 300 includes a login/logout toggle command 310, user identification data 320, and one or more traffic statistics session links 330 and 340. The web page 300 can, for example, be served from the statistics server 110 after a user has logged into a user account.

The login/logout toggle command 310 can be selected to log in under the user account or logout. As shown, a user, User 1, as indicated by the user identification data 320 is currently logged into a statistics system, such as the statistics sever 110. The traffic statistics session links 330 and 340 can, for example, define a list of web pages or domains for which the publisher is tracking traffic statistics and for which the generation of an overlay of traffic statistics data is authorized.

In one implementation, the traffic statistics session links that are displayed correspond to web pages or web sites for which the logged-in user has access to view. For example, as shown in FIG. 3, the user User 1 is an employee of a publisher and has access to view an overlay of traffic statistics for the web sites defined by the traffic statistics session links 330 and 340. Another user that is an employee of the same publisher, however, may have different privileges, and thus upon logging into the statistics server 110 the other user may be presented different traffic statistics session links.

Figure 4:
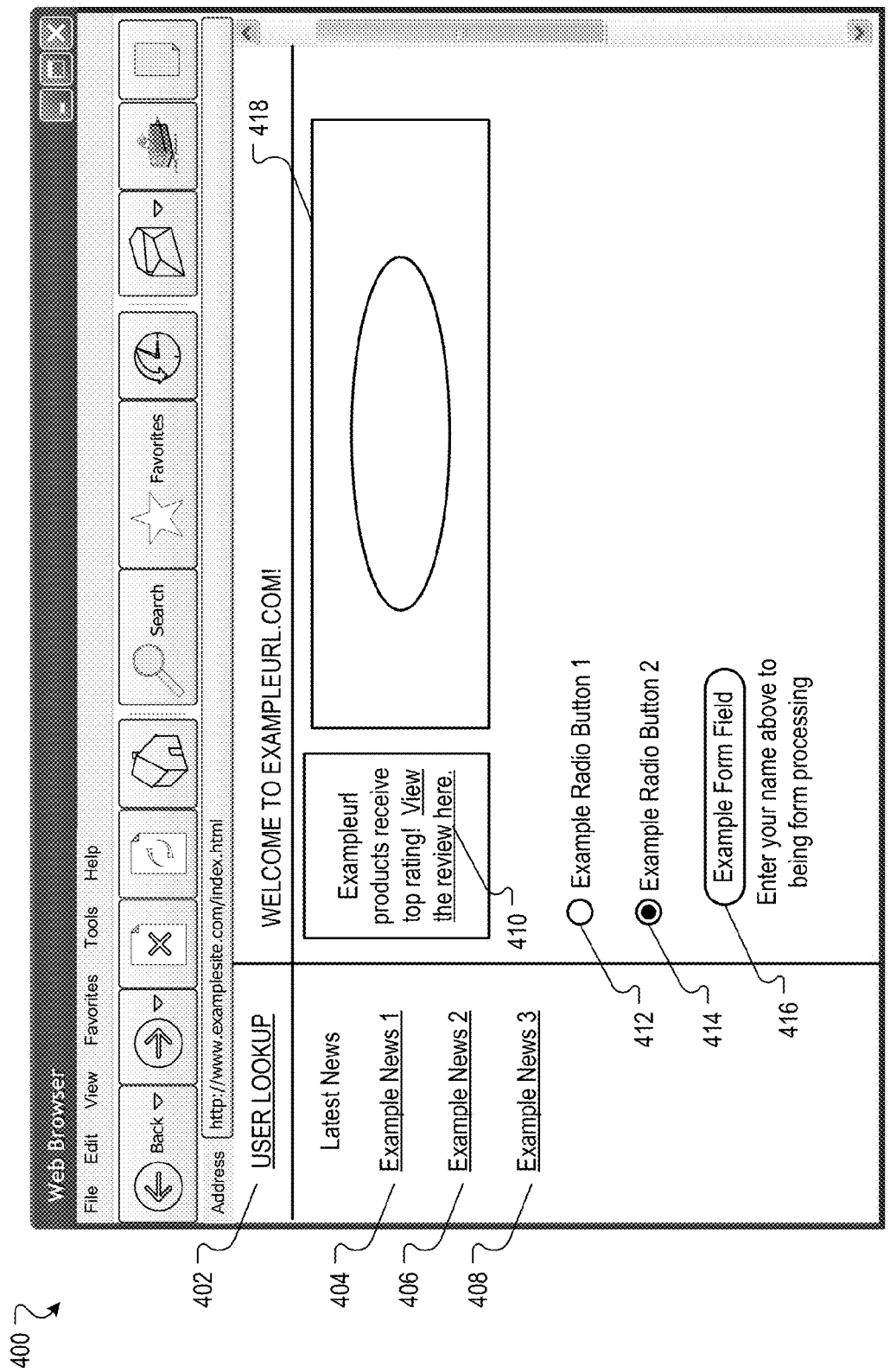
FIG. 4 is a diagram of an example publisher web page.

FIG. 4 is a diagram of an example publisher web page 400. The example web page 400 includes traffic content 402, 404, 406, 408, 410, 412, 414, 416 and 418. The traffic content 402, can, for example, link to another page within the domain of the example web page 400. The traffic content 404, 406, 408 and 410 can, for example, link to other web pages outside of the domain of the example web page 400. The traffic content 412 and 412 can, for example, include actuable items, such as radio buttons. The traffic content 416 can, for example, include a free-form text field. The traffic content 418 can, for example, be an image, the selection of which links to another web page related to the image. Other traffic content can also be used.

The example web page 400 can, for example, be accessed by typing in the URL at a client browser. Alternatively, the example web page 400 can be displayed upon an authentication failure, e.g., when the first traffic statistics instructions 160 or 260 do not detect a traffic statistics session token 153, or the traffic statistics session token 153 is not validated.

Figure 5:
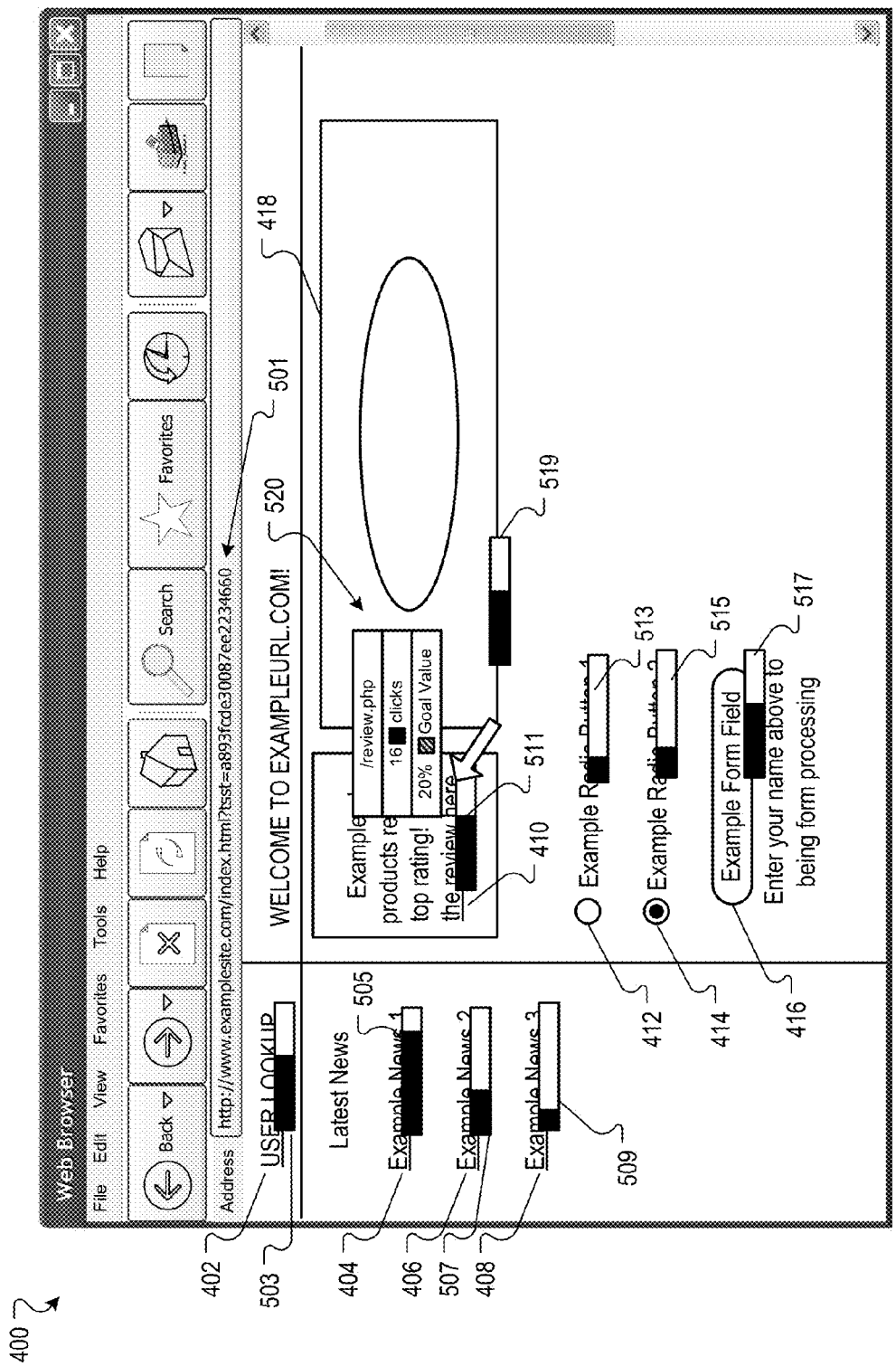
FIG. 5 is a diagram of the example publisher web page rendered in a statistics session environment.

FIG. 5 is a diagram of the example publisher web page 400 rendered in a statistics session environment. The web page 400 of FIG. 5 can, for example, be rendered in the same manner as in FIG. 4, e.g., in native form at a client device 150 or 250. In this example, traffic statistics data 503, 505, 507, 509, 511, 513, 515, 517 and 519 are visually represented proximate to corresponding traffic content 402, 404, 406, 408, 410, 412, 414, 416 and 418.

The statistics session environment in which the web page 400 is rendered can, for example be instantiated by selection of the corresponding traffic statistics session link 340 of FIG. 3. In response to selecting the traffic statistics session link 340, a client device can, for example, issue a request to a publisher server for the web page 400, and append a traffic statistics token 501, e.g., the encrypted token tsst=a893fcde30087ee2234660 to the request for the web page 400. The traffic statistics data can, for example, include one or more visual indicia of a traffic statistic, e.g., number of clicks for a corresponding link; a percentage of clicks with respect to all clicks on the web page 400; a conversion rate for a goal as defined by a user, etc.

In one implementation, selection of the traffic statistics data, e.g., selection of traffic statistics data 511, can display additional detail related to the selected traffic statistics data. For example, the pop-up box 520 indicates the page within the domain to which the traffic content 410 links, e.g., review-.php, the number of total clicks on traffic content 410, e.g., 16, and the conversion rate, e.g., 20%, indicating that the publisher has only achieved 20% of the publisher's goal of directing at least 80 visitors to the page review.php. Other traffic statistics data can also be displayed.

Figure 6:
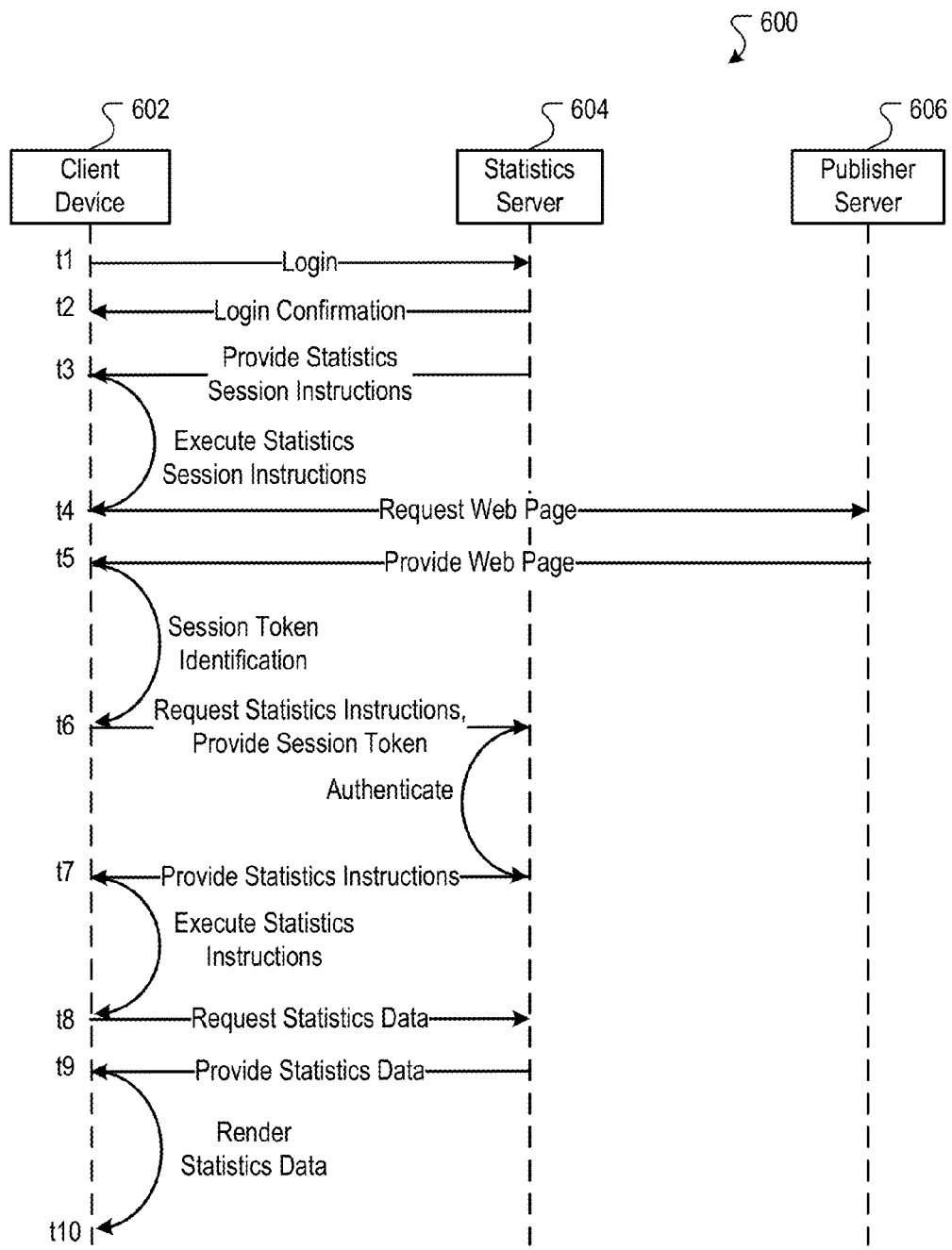
FIG. 6 is a timing diagram of an example statistics overlay process.

FIG. 6 is a timing diagram 600 of an example statistics overlay process. The timing diagram 600 depicts processes and actions associated with a client device 602, a statistics server 604, and a publisher server 606 in an example implementation as time elapses downward along a vertical axis.

At a time t1, the client device 602 initiates a login process for a user login, and at a time t2, the statistics server 604 authenticates and confirms the login.

At a time t3, the statistic server 604 provides statistics session instructions, such as the instructions 120 of FIG. 1. The client device 602 executes the statistics session instructions, and at a time t4, the client device 602 issues a request for a web page to a publisher server 606. For example, at the time t4, a user of the client device 602 may select a traffic statistics session link, such as one of the traffic statistics session links 330 or 340 of FIG. 3.

At a time t5, the publisher server 606 provides the requested web page to the client device 602, and the client device 602 performs a session token identification process. For example, the first traffic statistics instructions 160 can be executed to perform a session token identification process. If a session token is not identified, then the client device 602 can render the page without overlaying any traffic statistics data.

If, however, a session token is identified, then at a time t6, the client device 602 requests statistics instructions from the statistics server 604. For example, the client device 602 can request the second traffic statistics instructions 170. The session token can be passed to the statistics server 604 with the request.

The statistics server 604 performs an authentication process, and if the session token is authenticated, then at time t7 the statistics instructions are provided to the client device 602. The client device 602 can, for example, execute the statistics instructions to identify traffic content instructions in the web page.

At a time t8, the client device 602 can issue a request to the statistics server 604 for traffic statistics data corresponding to the identified traffic content instructions, and at a time t9 the statistics server 604 can provide the requested statistics data to the client device 602. The client device 602 can render the statistics data and overlay the traffic statistics data (e.g., proximate to the related traffic content in the web page) at the time t10.

Figure 7:
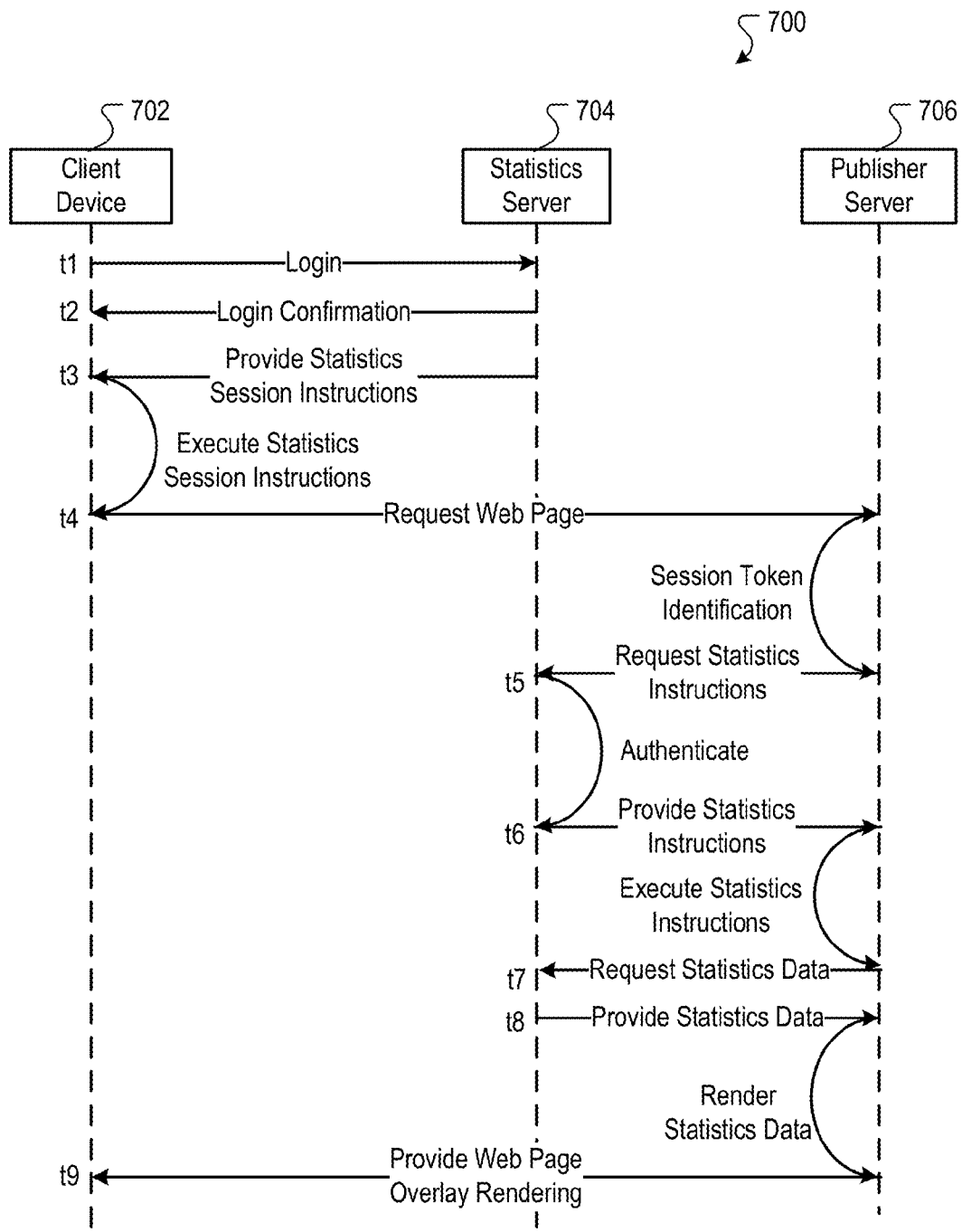
FIG. 7 is a timing diagram of another example statistics overlay process.

FIG. 7 is a timing diagram 700 of another example statistics overlay process. The timing diagram 700 depicts processes and actions associated with a client device 702, a statistics server 704, and a publisher server 706 in an example implementation as time elapses downward along a vertical axis.

At a time t1, the client device 702 initiates a login process for a user login, and at a time t2, the statistics server 704 authenticates and confirms the login.

At a time t3, the statistic server 704 provides statistics session instructions, such as the instructions 120 of FIG. 1. The client device 702 executes the statistics session instructions, and at a time t4, the client device 702 issues a request for a web page to a publisher server 706. For example, at the time t4, a user of the client device 702 may select a traffic statistics session link, such as one of the traffic statistics session links 330 or 340 of FIG. 3.

The publisher server 706, upon receiving the web page request, performs a session token identification process. For example, the first traffic statistics instructions 260 can be executed to perform a session token identification process. If a session token is not identified, then the publisher server 704 can provide the requested web page to the client device 702, in which case the web page is rendered without an overlay of traffic statistics data.

If, however, a session token is identified, then at a time t5, the publisher server 706 requests statistics instructions from the statistics server 704. For example, the publisher server 706 can request the second traffic statistics instructions 270. The session token can be passed to the statistics server 704 with the request.

The statistics server 704 performs an authentication process, and if the session token is authenticated, then at time t6 the statistics instructions are provided to the publisher server 706. The publisher server 706 can, for example, execute the statistics instructions to identify traffic content instructions in the web page.

At a time t7, the publisher server 706 can issue a request to the statistics server 704 for traffic statistics data corresponding to the identified traffic content instructions, and at a time t8 the statistics server 704 can provide the requested statistics data to the publisher server 706. The publisher server 706 can generate overlay data, such as overlay data 290, and at a time t9 can provide the web page and overlay data to the client device 704 for rendering.

In another implementation, the publisher server 706 can first provide the requested web page, and can provide the overlay data in a separate communication once the overlay data is generated.

Figure 8:
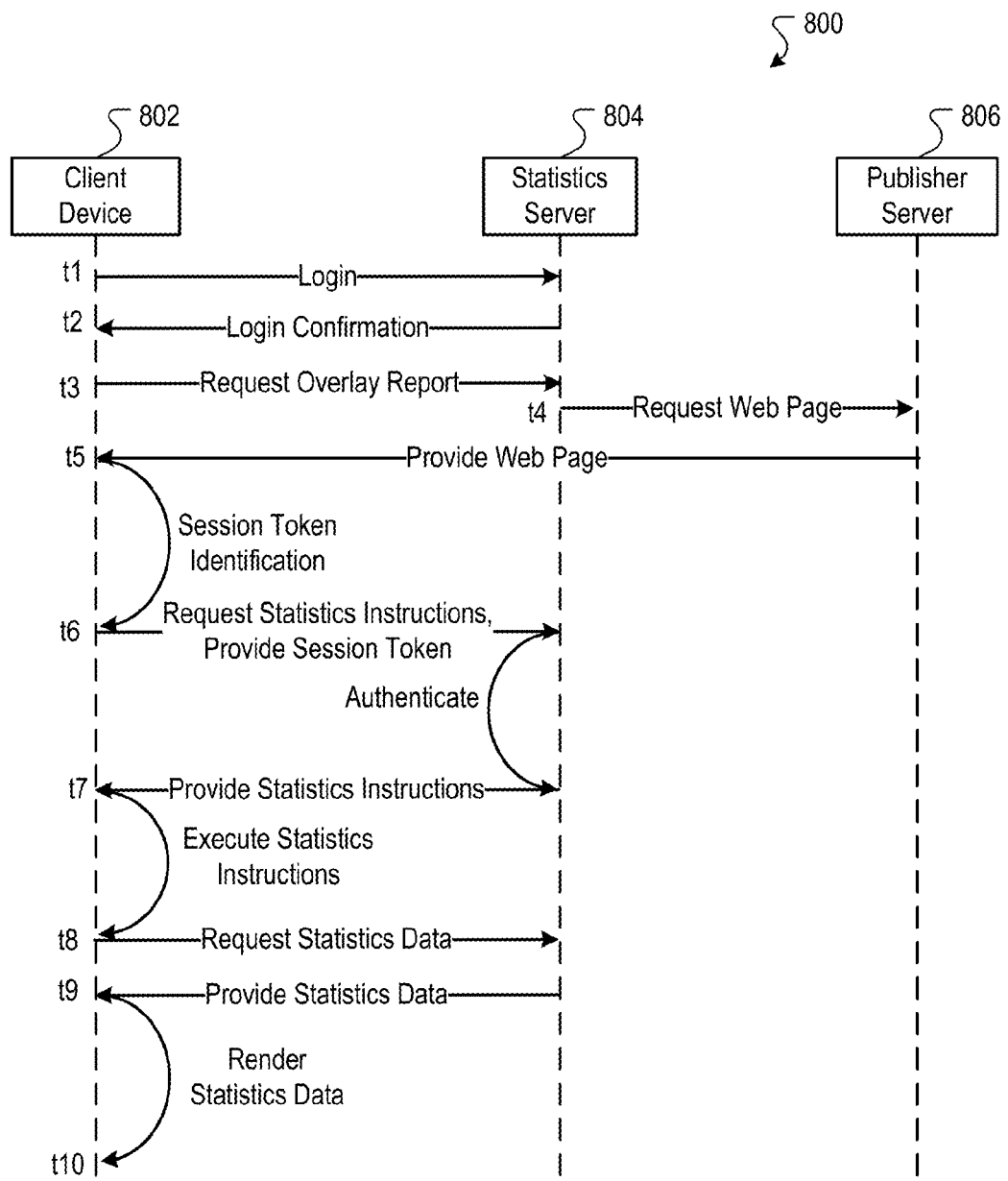
FIG. 8 is a timing diagram of another example statistics overlay process.

FIG. 8 is a timing diagram 800 of another example statistics overlay process. The timing diagram 800 depicts processes and actions associated with a client device 802, a statistics server 804, and a publisher server 806 in an example implementation as time elapses downward along a vertical axis. In the implementation of FIG. 8, the statistics server 804 can, for example, generate a proxy request on behalf of the client device 802. Accordingly, the client device 802 need not directly request the web page from the publisher server 806.

At a time t1, the client device 802 initiates a login process for a user login, and at a time t2, the statistics server 804 authenticates and confirms the login.

At a time t3, the client device 802 requests an overlay report from the statistics sever 804. At a time t4, the statistics server 804 generates a proxy request on behalf of the client device 802 to the publisher server 806.

At a time t5, the publisher server 806 provides the requested web page to the client device 802, and the client device 802 performs a session token identification process. For example, the first traffic statistics instructions 160 can be executed to perform a session token identification process. If a session token is not identified, then the client device 802 can render the page without overlaying any traffic statistics data.

If, however, a session token is identified, then at a time t6, the client device requests statistics instructions from the statistics server 804. For example, the client device 802 can request the second traffic statistics instructions 170. The session token can be passed to the statistics server 604 with the request.

The statistics server 804 performs an authentication process, and if the session token is authenticated, then at time t7 the statistics instructions are provided to the client device 802. The client device 802 can, for example, execute the statistics instructions to identify traffic content instructions in the web page.

At a time t8, the client device 802 can issue a request to the statistics server 804 for traffic statistics data corresponding to the identified traffic content instructions, and at a time t9 the statistics server 804 can provide the requested statistics data to the client device 802. The client device 802 can render the statistics data and overlay the traffic statistics data (e.g., proximate to the related traffic content in the web page) at the time t10.

Figure 9:
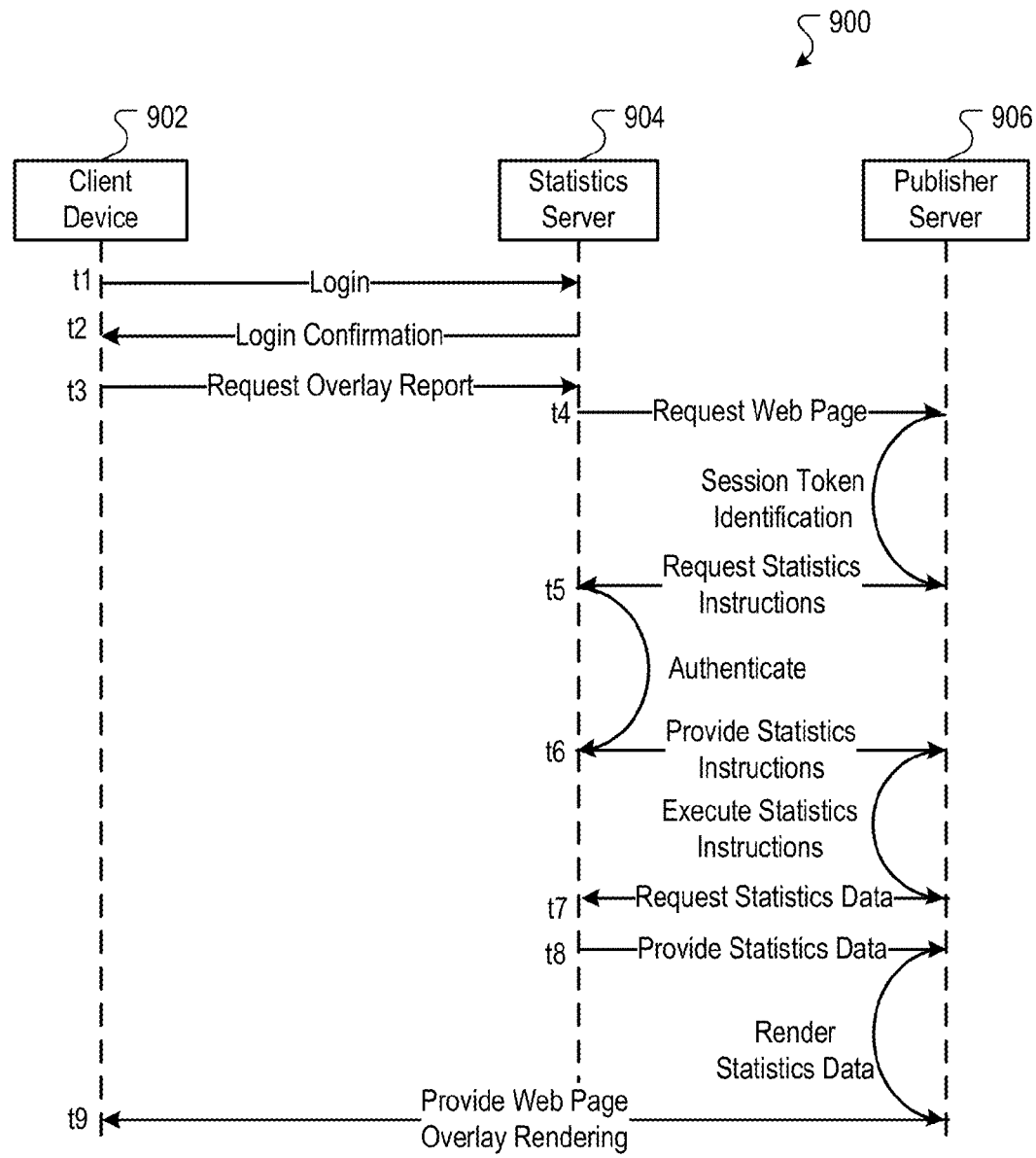
FIG. 9 is a timing diagram of another example statistics overlay process.

FIG. 9 is a timing diagram 900 of another example statistics overlay process. The timing diagram 900 depicts processes and actions associated with a client device 902, a statistics server 904, and a publisher server 906 in an example implementation as time elapses downward along a vertical axis. In the implementation of FIG. 9, the statistics server 804 can, for example, generate a proxy request on behalf of the client device 802. Accordingly, the client device 802 need not directly request the web page from the publisher server 806.

At a time t1, the client device 902 initiates a login process for a user login, and at a time t2, the statistics server 904 authenticates and confirms the login.

At a time t3, the client device 902 requests an overlay report from the statistics sever 904. At a time t4, the statistics server 904 generates a proxy request on behalf of the client device 902 to the publisher server 906.

The publisher server 906, upon receiving the web page request, performs a session token identification process. For example, the first traffic statistics instructions 260 can be executed to perform a session token identification process. If a session token is not identified, then the publisher server 904 can provide the requested web page to the client device 902, in which case the web page is rendered without an overlay of traffic statistics data.

If, however, a session token is identified, then at a time t5, the publisher server 906 requests statistics instructions from the statistics server 904. For example, the publisher server 906 can request the second traffic statistics instructions 270. The session token can be passed to the statistics server 904 with the request.

The statistics server 904 performs an authentication process, and if the session token is authenticated, then at time t6 the statistics instructions are provided to the publisher server 906. The publisher server 906 can, for example, execute the statistics instructions to identify traffic content instructions in the web page.

At a time t7, the publisher server 906 can issue a request to the statistics server 904 for traffic statistics data corresponding to the identified traffic content instructions, and at a time t8 the statistics server 904 can provide the requested statistics data to the publisher server 906. The publisher server 906 can generate overlay data, such as overlay data 290, and at a time t9 can provide the web page and overlay data to the client device 904 for rendering.

Figure 10:
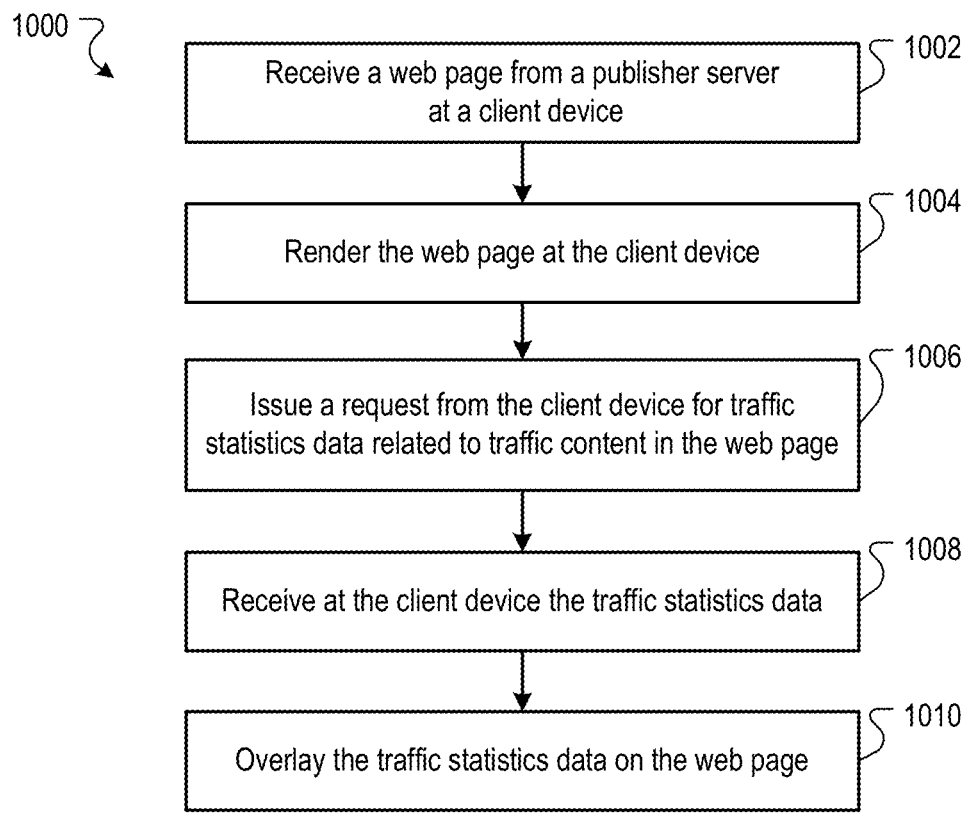
FIG. 10 is flow diagram of an example client overlay process.

FIG. 10 is flow diagram of an example client overlay process 1000. The process 1000 can, for example, be implemented in a client device, such as the client device 150 of FIG. 1.

Stage 1002 receives a web page from a publisher server at a client device. For example, the client device 150 can receive the page content instructions 132 from the publisher server 130.

Stage 1004 renders the web page at the client device. For example, the client device 150 can generate the web page 140 based on the page content instructions 132.

Stage 1006 issues a request from the client device for traffic statistics data related to traffic content in the web page. For example, the client device 150 can request traffic statistics data related to the traffic content 142 and 144. In one implementation, the request can be subject to one or more security protocols at the statistics server 110. In one implementation, execution of the first and second traffic statistics instructions 160 and 170 can cause the client device 150 to generate the request.

Stage 1008 receives at the client device the traffic statistics data. For example, the client device can receive traffic statistics data related to the traffic content 142 and 144.

Stage 1010 overlays the traffic statistics data (e.g., proximate to the related traffic content) on the web page. For example, the client device 150, executing the second traffic statistics instructions 170, can overlay traffic statistics data 143 and 145 proximate to the traffic content 144 and 146.

Figure 11:
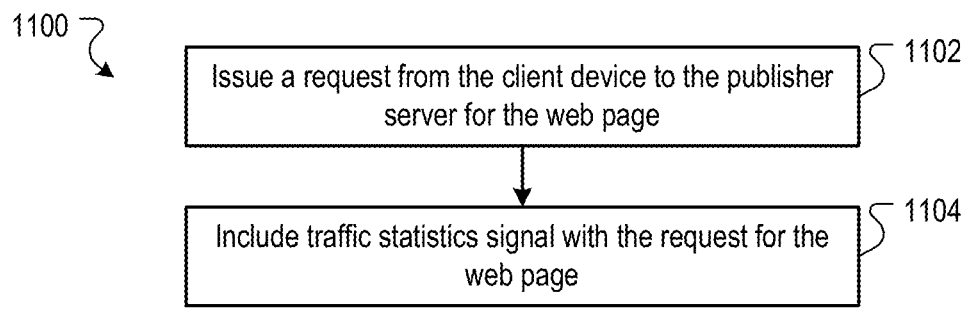
FIG. 11 is a flow diagram of an example client statistics session instantiation process.

FIG. 11 is a flow diagram of an example client statistics session instantiation process 1100. The process 1100 can, for example, be implemented in a client device, such as the client device 150 of FIG. 1 or the client device 250 of FIG. 2.

Stage 1102 issues a request from the client device to the publisher server for the web page. For example, the client device 150 can issue a request 152 to the publisher server for a web page when a user of the client device 150 selects one of the traffic statistics session links 330 or 340.

Stage 1104 includes traffic statistics signal with the request for the web page. In one implementation, the signal can include a traffic statistics token with the request for the web page. For example, the client device 150, executing the traffic statistics session instructions 120, can append a token 153 to the request 152.

Figure 12:
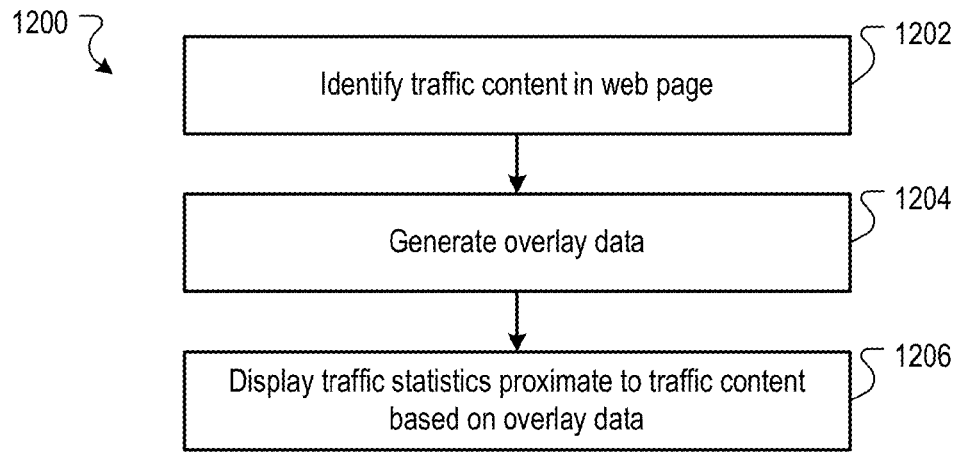
FIG. 12 is a flow diagram of an example overlay data generation process.

FIG. 12 is a flow diagram of an example overlay data generation process 1200. The process 1200 can, for example, be implemented in a client device, such as the client device 150 of FIG. 1.

Stage 1202 identifies traffic content in web page. For example, the client device 150, executing the second traffic statistics instructions 170, can identify traffic content from the instructions 134 that are included in the page content instructions 132.

Stage 1204 generates overlay data. For example, the client device 150, executing the second traffic statistics instructions 170, can generate overlay data 190.

Sage 1206 displays the traffic statistics data (e.g., proximate to traffic content) based on the overlay data. For example, the client device 150 can render the web page 140 and display the traffic statistics data 143 and 145 proximate to the traffic content 142 and 144.

Figure 13:
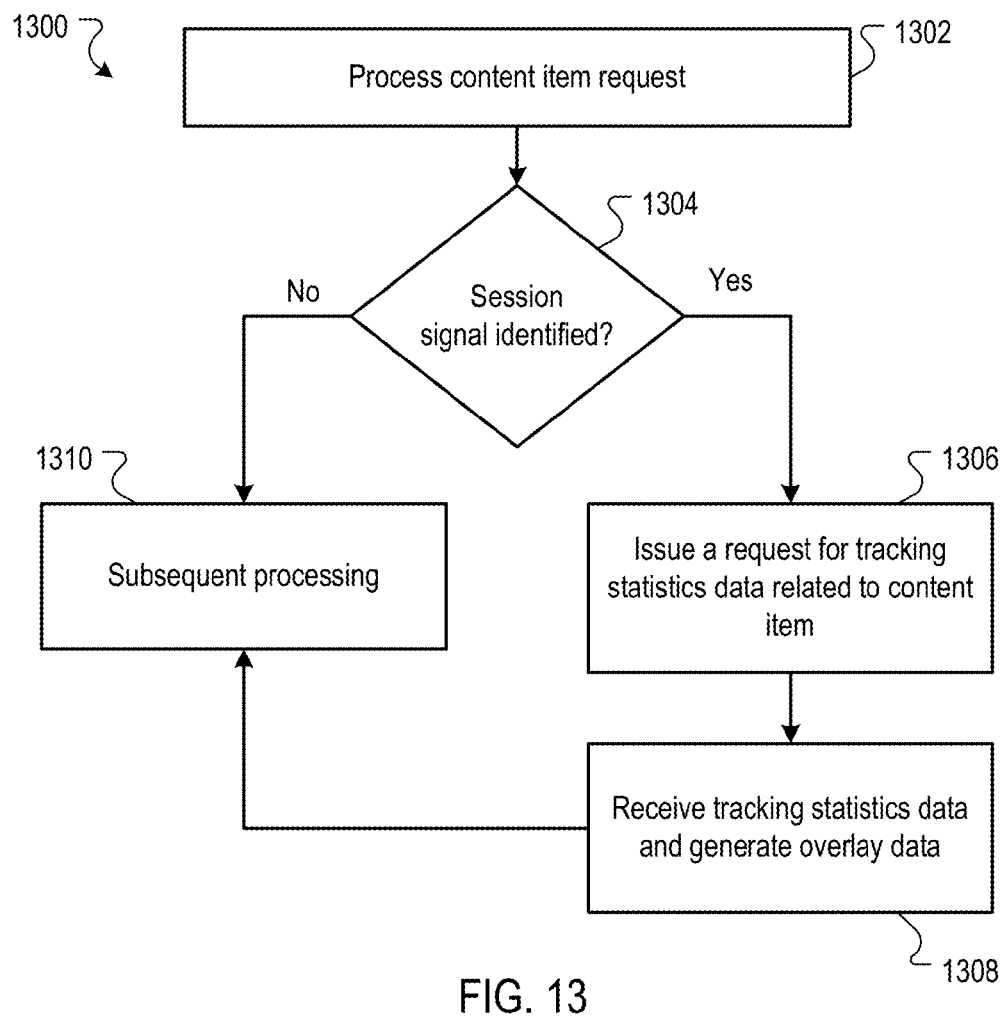
FIG. 13 is a flow diagram of an example tracking statistics session process for a content item.

FIG. 13 is a flow diagram of an example tracking statistics session process 1300 for a content item. The process 1300 can, for example, be implemented in a client device, such as the client device 150 of FIG. 1, or in a publisher server, such as the publisher server 230 of FIG. 2.

Stage 1302 processes a content item request. For example, the client device 150 can generate a content item request to a publisher server 130. Likewise, a publisher server 230 can receive a content item request from a client 250.

Stage 1304 determines whether the request includes a signal indicating a desire to see traffic statistics. In one implementation the signal includes a session token that is included in the content item request. For example, the client device 150, executing the first traffic statistics instructions 160, or a combined set traffic statistics instructions 180, can determine whether a session token is identified in the content item request. Likewise, the publisher server 230, executing the first traffic statistics instructions 260, or a combined set traffic statistics instructions 280, can determine whether a session token is identified in the content item request.

If stage 1304 determines that a signal is identified in the content item request, then stage 1306 issues a request for tracking statistics data related to the content item. For example, the client device 150, executing the first traffic statistics instructions 160, can request the second traffic statistics instructions 170. Upon receiving the second traffic statistics instructions 170, the client device 150 can execute the second traffic statistics instructions 170 to request the tracking statistics data. Alternatively, the client device 150, executing a combined set of traffic statistics instructions 180, can request the tracking statistics data.

Likewise, the publisher server 230, executing the first traffic statistics instructions 260, can request the second traffic statistics instructions 270. Upon receiving the second traffic statistics instructions 270, the publisher server 230 can execute the second traffic statistics instructions 270 to request the tracking statistics data. Alternatively, the publisher server 230, executing a combined set traffic statistics instructions 280, can request the tracking statistics data.

Stage 1308 receives the tracking statistics data and generates overlay data. For example, the client device 150, executing the second traffic statistics instructions 170, or a combined set traffic statistics instructions 180, can generate the overlay data 190. Likewise, the publisher server 230, executing the second traffic statistics instructions 270, or a combined set traffic statistics instructions 280, can generate the overlay data 290.

After stage 1308, or if a signal is not identified in stage 1304, stage 1310 performs any additional subsequent processing, e.g., rending a web page and any overlay data in a client device, or transmitting the web page and overlay data to a client device.

FIG. 14 is a block diagram of an example computer system 1400 that can be utilized to implement the systems and methods described herein. The architecture of the system 1400 can, for example, be used to implement a computer client, a computer server, or some other computer device.

The system 1400 includes a processor 1410, a memory 1420, a storage device 1430, and an input/output device 1440. Each of the components 1410, 1420, 1430, and 1440 can, for example, be interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430.

The memory 1420 stores information within the system 1400. In one implementation, the memory 1420 is a computer-readable medium. In one implementation, the memory 1420 is a volatile memory unit. In another implementation, the memory 1420 is a non-volatile memory unit.

The storage device 1430 is capable of providing mass storage for the system 1400. In one implementation, the storage device 1430 is a computer-readable medium. In various different implementations, the storage device 1430 can, for example, include a hard disk device, an optical disk device, or some other large capacity storage device.

The input/output device 1440 provides input/output operations for the system 1400. In one implementation, the input/output device 1440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1460.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Recitation of elements or structures above in a particular order or according to a particular reference of "first," "second," etc. does not limit the invention to a corresponding order in the claims. Elements recited in particular order or a particular reference of "first," "second," etc. in a claim may be supported an element or structure in the written description above that is not likewise referenced in the same particular order or according to the same particular reference of "first," "second," etc.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   rendering, at a client device using web page instructions provided by a publisher server, a web page that includes traffic content items, each of the traffic content items being a content item displayed on the web page and that facilitates navigation from the web page or that facilitates interaction with the web page;
   receiving, at the client device, traffic statistics data related to one or more navigations through the traffic content items or visitor interactions with the traffic content items, the traffic statistics data being generated by execution of traffic statistic instructions provided by a statistics server different from the publisher server;
   rendering, at the client device and subsequent to the rendering of the web page, overlay data including the traffic statistics, the traffic statistics being rendered from the traffic statistics data to appear proximate to the traffic content items to which the traffic statistics are related; and preserving an appearance of the rendered web page underlying the overlay data while rendering the overlay data on the web page.

2. The method of claim 1, further comprising:

sending, by the client device using the web page instructions, a request for the traffic statistic instructions to the statistics server; and receiving, at the client device, the traffic statistic instructions from the statistics server in response to the request.

3. The method of claim 1, wherein receiving the traffic statistics data comprises:

receiving the traffic statistics data from the statistics server.

4. The method of claim 1, wherein receiving the traffic statistics data comprises:

receiving the traffic statistics data from the publisher server.

5. The method of claim 1, wherein rendering the overlay data comprises rendering the overlay data in an iFrame on the web page.

6. The method of claim 1, further comprising:

instantiating a traffic statistics session at the client device;

sending a request from the client device to the publisher server for the web page; and including a signal with the request for the web page indicating a request for traffic statistics for the web page.

7. The method of claim 6, wherein including the signal with the request for the web page comprises:

appending a traffic statistics token to the request for the web page.

8. The method of claim 1, wherein the traffic content items include hyperlinks to other web pages.

9. The method of claim 8, wherein rendering the overlay data comprises:

rendering visual representations of the traffic statistics adjacent to the related traffic content items on the web page.

10. The method of claim 9, wherein the visual representations include counters indicating a number of clicks on respective ones of the hyperlinks.

11. A method, comprising:

providing, by a statistics server, traffic statistics instructions to a requesting device, the traffic statistic instructions cause the requesting device to send a request to the statistics server for traffic statistics data for one or more navigations through traffic content items or visitor interactions with the traffic content items, each of the traffic content items being a content item displayed on a web page rendered by a client device and facilitating navigation from the web page or facilitating interaction with the web page, wherein web page instructions to render the web page are provided to the client device by a publisher server different from the statistics server;

receiving, by the statistics server, the request for traffic statistics data for the web page from the requesting device; and providing, by the statistics server, the traffic statistics data to the requesting device in response to the request for traffic statistics data, wherein the traffic statistics are rendered from the traffic statistics data in overlay data on the web page by the client device, subsequent to the client device rendering the web page, proximate to the traffic content items to which the traffic statistics are related while an appearance of the rendered web page underlying the overlay data is preserved.

12. The method of claim 11, wherein the requesting device is the publisher server.

13. The method of claim 11, wherein the requesting device is the client device.

14. The method of claim 13, further comprising:

receiving a traffic statistics session request from the client device to initiate a traffic statistics session to request the traffic statistics;

authenticating the traffic statistics session request; and providing the traffic statistics instructions to the client device only upon a positive authentication.

15. A system comprising:

one or more data processors; and instructions stored on a computer storage apparatus that when executed by the one or more data processors cause the one or more data processors to perform operations comprising:

rendering, at a client device using web page instructions provided by a publisher server, a web page that includes traffic content items, each of the traffic content items being a content item displayed on the web page and that facilitates navigation from the web page or that facilitates interaction with the web page;

receiving, at the client device, traffic statistics data related to one or more navigations through the traffic content items or visitor interactions with the traffic content items, the traffic statistics data being generated by execution of traffic statistic instructions provided by a statistics server different from the publisher server;

rendering, at the client device and subsequent to the rendering of the web page, overlay data including the traffic statistics, the traffic statistics being rendered from the traffic statistics data to appear proximate to the traffic content items to which the traffic statistics are related; and preserving an appearance of the rendered web page underlying the overlay data while rendering the overlay data on the web page.

16. The system of claim 15, wherein the instructions, when executed by the one or more data processors, cause the one or more data processors to perform further operations comprising:

sending, by the client device using the web page instructions, a request for the traffic statistic instructions to the statistics server; and receiving, at the client device, the traffic statistic instructions from the statistics server in response to the request.

17. The system of claim 15, wherein receiving the traffic statistics data comprises:

receiving the traffic statistics data from the statistics server.

18. The system of claim 15, wherein receiving the traffic statistics data comprises:

receiving the traffic statistics data from the publisher server.

19. The system of claim 15, wherein rendering the overlay data comprises rendering the overlay data in an iFrame on the web page.

20. The system of claim 15, wherein the traffic content items include hyperlinks to other web pages.

* * * * *